United States Patent
Kandler et al.

(10) Patent No.: US 11,872,853 B2
(45) Date of Patent: Jan. 16, 2024

(54) SELECTIVE ACTIVATION OF TIRE PRESSURE MONITORING SYSTEM (TPMS) SENSOR MODULES FOR RADIO-FREQUENCY (RF) COMMUNICATION USING DIRECTIONAL RF BEAMS

(71) Applicant: Infineon Technologies AG, Neubiberg (DE)

(72) Inventors: Michael Kandler, Sauerlach (DE); Thomas Engl, Munich (DE); Tuncay Erdoel, Unterhaching (DE); Maximilian Werner, Fischach (DE); Maciej Wojnowski, Munich (DE)

(73) Assignee: Infineon Technologies AG, Neubiberg (DE)

( * ) Notice: Subject to any disclaimer, the term of this patent is extended or adjusted under 35 U.S.C. 154(b) by 205 days.

(21) Appl. No.: 17/335,458

(22) Filed: Jun. 1, 2021

(65) Prior Publication Data
US 2022/0379670 A1    Dec. 1, 2022

(51) Int. Cl.
*B60C 23/04*    (2006.01)
*B60C 11/24*    (2006.01)

(52) U.S. Cl.
CPC ...... *B60C 23/0444* (2013.01); *B60C 23/0416* (2013.01); *B60C 11/246* (2013.01)

(58) Field of Classification Search
CPC .......... B60C 23/0444; B60C 23/0416; B60C 11/246
See application file for complete search history.

(56) References Cited

U.S. PATENT DOCUMENTS

| | | | |
|---|---|---|---|
| 6,861,942 B1 | 3/2005 | Knapp et al. | |
| 7,948,364 B2 | 5/2011 | Lin et al. | |
| 11,034,196 B2 * | 6/2021 | Stewart | B60C 23/0472 |
| 2005/0273218 A1 * | 12/2005 | Breed | G07C 5/085 |
| | | | 701/2 |

(Continued)

FOREIGN PATENT DOCUMENTS

| | | |
|---|---|---|
| CN | 101505979 A | 8/2009 |
| CN | 204272135 U | 4/2015 |

(Continued)

OTHER PUBLICATIONS

Chengli, Principle and Overhaul of Automotive Chassis electronic Control Systems, 1st edition, 2013, pp. 261-263.

*Primary Examiner* — Curtis A Kuntz
*Assistant Examiner* — James E Munion
(74) *Attorney, Agent, or Firm* — Harrity & Harrity, LLP (57) ABSTRACT

A tire pressure monitoring system (TPMS) includes a communication interface device configured to communicate with a target TPMS sensor module. The communication interface device include a radio frequency (RF) transceiver configured to generate at least one wake-up signal; an antenna array configured to transmit each wake-up signal as a directional RF beam; a processing circuit configured to monitor for a response signal in response to the antenna array transmitting the at least one wake-up signal; and a power amplifier configured to set a power of each wake-up signal according to an adjustable power setting such that the power of each subsequent wake-up signal is increased in discrete steps until the response signal is received by the RF transceiver.

26 Claims, 5 Drawing Sheets

(56) References Cited

U.S. PATENT DOCUMENTS

| | | | |
|---|---|---|---|
| 2006/0091996 A1 | 5/2006 | Conner et al. | |
| 2007/0159315 A1 | 7/2007 | Murata et al. | |
| 2009/0186584 A1* | 7/2009 | Lambrecht | H04W 52/42 455/67.11 |
| 2009/0237228 A1 | 9/2009 | Watabe | |
| 2010/0141416 A1* | 6/2010 | Kukshya | B60C 23/0433 340/447 |
| 2017/0303090 A1 | 10/2017 | Stitt et al. | |
| 2019/0152277 A1 | 5/2019 | Hassani et al. | |

FOREIGN PATENT DOCUMENTS

| | | | |
|---|---|---|---|
| CN | 109720156 A | 5/2019 | |
| CN | 111823791 A | 10/2020 | |
| FR | 2932594 A1 | 12/2009 | |
| JP | 2009105614 A * | 5/2009 | |
| JP | 2009105614 A | 5/2009 | |
| WO | 2006099079 A2 | 9/2006 | |
| WO | 2014106969 A1 | 7/2014 | |
| WO | WO-2014106969 A1 * | 7/2014 | B60C 23/0444 |
| WO | WO-2019002410 A1 * | 1/2019 | B60R 16/023 |
| WO | WO-2022039719 A1 * | 2/2022 | B60C 23/0462 |

\* cited by examiner

SELECTIVE ACTIVATION OF TIRE PRESSURE MONITORING SYSTEM (TPMS) SENSOR MODULES FOR RADIO-FREQUENCY (RF) COMMUNICATION USING DIRECTIONAL RF BEAMS

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The sensor module contains a pressure sensor, a microcontroller, a radio-frequency (RF) transmitter, and a coin battery cell.

Principally, the sensor module measures the tire pressure and uses a unidirectional link to transmit the measurement data to a central unit in the vehicle. Since battery cannot be changed, sensor module lifetime is determined by battery lifetime. A major portion of the power consumption is generated by the RF transmission. Hence, it is an important task to reduce power consumption for RF transmission as much as possible.

The sensor module may also have a low-frequency (LF) receiver, which is used to configure the TPMS sensor module after mounting sensor module to the tire in the vehicle production or in a repair garage (e.g., in case of replacement modules or firmware update for maintenance of sensor modules which are already in use). Typically, an external configuration unit, such as the vehicle electronic control unit (ECU) or a configuration tool, configures the TPMS sensor modules.

One advantage of the LF signal is its short range, which ensures that only one single TPMS sensor module is close enough to the transmitter to receive the LF signal. This advantage also becomes a disadvantage in that the configuration unit needs to be very close to the TPMS sensor module. That means that either the TPMS sensor modules need to be moved into the vicinity of the configuration unit or vice versa.

Typically, the downlink communication from the sensor module to the vehicle is implemented via the RF transmitter at 315 or 434 MHz, whereas the uplink communication to the sensor module is implemented via the LF receiver at 125 kHz. Thus, two communication devices with two communication channels are used for bidirectional communication between the vehicle and the sensor module. This increases the cost of the overall TPMS sensor module.

On the other hand, if the LF receiver were to be replaced with an RF receiver, cost could be decreased by implementing one RF technology for bi-directional communication. However, RF signals have a much longer range and the risk of cross-talking with other TPMS sensor modules increases.

In order to properly assess each tire, the configuration unit must be able to connect with each TPMS sensor module on an individual basis. Meaning, the configuration unit must be able to detect one or more TPMS sensor modules and select one of the TPMS sensor modules based on certain criteria to (1) form a communication link therewith so that it can configure the TPMS sensor module accordingly and (2) subsequently distinguish communications received therefrom from the other TPMS sensor modules. It also means that configuration unit should localize each TPMS sensor module in that it knows which TPMS sensor module is located at which tire position (e.g., front left, rear right, etc.).

In the case that the communication technology changes from LF to RF, new methods have to be found to communicate with only one selected TPMS sensor module, even if others are close by. Therefore, an improved TPMS capable of detecting and selectively communicating with each TPMS sensor module may be desirable.

SUMMARY

One or more embodiments provide a tire pressure monitoring system (TPMS) including: a communication interface device and a TPMS sensor module having a sensor identifier (ID). The communication interface device includes: a first radio frequency (RF) transceiver configured to generate at least one wake-up signal; an antenna array configured to transmit each wake-up signal as a directional RF beam; and a first processing circuit configured to monitor for a response signal in response to the antenna array transmitting the at least one wake-up signal. The TPMS sensor module includes: a pressure sensor configured to measure an internal air pressure of a first tire and generate first tire pressure information; a second RF transceiver configured to receive the at least one wake-up signal; and a second processing circuit configured to measure a signal strength of the at least one wake-up signal, compare the measured signal strength to a predetermined threshold, and trigger the response signal on a condition that the measured signal strength is equal to or greater than the predetermined threshold, wherein the second RF transceiver is configured to transmit the response signal, the response signal including at least the sensor ID.

One or more embodiments provide a method of communicating with a TPMS sensor module, the method including: transmitting, by a communication interface device, a first wake-up signal as a first directional radio frequency (RF) beam, the first wake-up signal being transmitted for establishing a data communication link with the TPMS sensor module; receiving, by the TPMS sensor module, the first wake-up signal, including measuring a signal strength of the first wake-up signal and comparing the measured signal strength to a predetermined threshold; and on a condition that the measured signal strength is equal to or greater than the predetermined threshold, triggering, by the TPMS sensor module, a first response signal in response to the first wake-up signal, including transmitting the first response signal that includes a sensor identifier (ID) of the TPMS sensor module.

One or more embodiments provide a TPMS sensor module having a sensor identifier (ID), the TPMS sensor module including: a pressure sensor configured to measure an internal air pressure of a first tire and generate first tire pressure information; a radio frequency (RF) transceiver configured to receive a wake-up signal for establishing data communication; and a processing circuit configured to measure a signal strength of the wake-up signal, compare the measured signal strength to a predetermined threshold, and trigger the response signal on a condition that the measured signal strength is equal to or greater than the predetermined threshold, wherein the RF transceiver is configured to transmit the response signal including at least the sensor ID.

One or more embodiments provide a TPMS, including: a communication interface device configured to communicate with a target TPMS sensor module, the communication interface device including: a radio frequency (RF) transceiver configured to generate at least one wake-up signal; an antenna array configured to transmit each wake-up signal as a directional RF beam towards the target TPMS sensor module; and a processing circuit configured to monitor for a response signal in response to the antenna array transmitting the at least one wake-up signal, wherein the processing circuit is configured to record a power setting of a wake-up signal of the at least one wake-up signal to which response signal is responsive, and control the RF transceiver to transmit a communication signal towards the target TPMS sensor module with the power setting of the wake-up signal to which response signal is responsive.

One or more embodiments provide a TPMS including: a communication interface device and a TPMS sensor module having a sensor identifier (ID). The communication interface device includes: a first radio frequency (RF) transceiver configured to generate at least one wake-up signal; an antenna array configured to transmit each wake-up signal as a directional RF beam; a first processing circuit configured to monitor for a response signal in response to the antenna array transmitting the at least one wake-up signal; and a power amplifier configured to set a power of each wake-up signal according to an adjustable power setting such that the power of each subsequent wake-up signal is increased in discrete steps until the response signal is received by the first RF transceiver. The TPMS sensor module includes: a pressure sensor configured to measure an internal air pressure of a first tire and generate first tire pressure information; a second RF transceiver configured to receive the at least one wake-up signal, wherein the second RF transceiver has a receiver sensitivity threshold; and a second processing circuit configured to detect a wake-up signal that meets or exceeds the receiver sensitivity threshold and trigger the response signal in response to detecting the wake-up signal, wherein the second RF transceiver is configured to transmit the response signal, the response signal including at least the sensor ID.

BRIEF DESCRIPTION OF THE DRAWINGS

Embodiments are described herein making reference to the appended drawings.

DETAILED DESCRIPTION

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, an acceleration, a temperature, a force, a current, or a voltage, but is not limited thereto. A sensor device, as described herein, may be an angle sensor, a linear position sensor, a speed sensor, motion sensor, a pressure sensor, acceleration sensor, temperature sensor, a magnetic field sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A sensor circuit may be referred to as a signal processing circuit and/or a signal conditioning circuit that receives the signal (i.e., sensor signal) from the pressure field sensor element in the form of raw measurement data. The sensor circuit may include an analog-to-digital converter (ADC) that converts the analog signal from the pressure sensor to a digital signal. The sensor circuit may also include a digital signal processor (DSP) that performs some processing on the digital signal (e.g., to prepare tire pressure information for transmission). Therefore, the sensor package comprises a circuit which conditions and amplifies the small signal of the pressure sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

According to one or more embodiments, a pressure sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Figure 1:
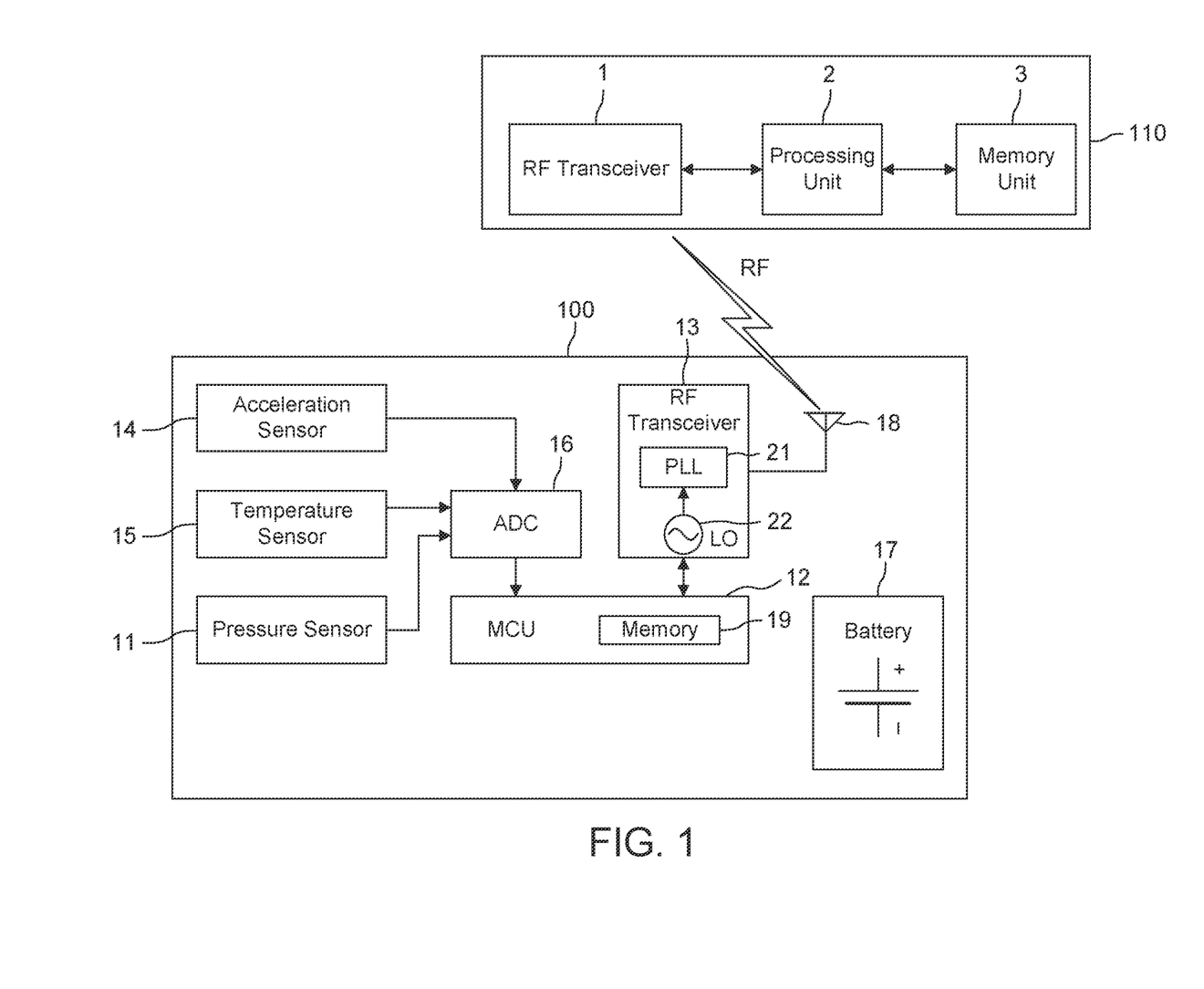
FIG. 1 illustrates a tire pressure monitoring system (TPMS) according to one or more embodiments.

FIG. 1 illustrates tire pressure monitoring system according to one or more embodiments. The tire pressure monitoring system includes a monolithic TPMS sensor module 100 and a communication interface device 110 that is configured to communicate with the TPMS sensor module 100. The TPMS sensor module 100 is a direct TPMS sensor mounted inside a tire. The TPMS sensor module 100 includes a pressure sensor 11, a microcontroller unit (MCU) 12, a radio frequency (RF) transceiver 13, an optional acceleration sensor 14, an optional temperature sensor 15, an ADC 16, a battery 17, and an antenna 18.

In particular, the acceleration sensor 14 may be a single axis or multi-axis accelerometer that is used for measuring the acceleration generated by car movement (e.g. for motion detection) and/or measuring the Earth's gravitational field. In the latter case, measuring the earth gravitational field results in a sine signal with 1 g amplitude due to tire rotation. In other words, sinusoidal signal generated from the motion of the acceleration sensor moving through the Earth's gravitational field as it rotates about an axis (i.e., as the tire rotates about its axis). This sinusoidal signal is referred to as +/−1 g signal. This +/−1 g signal can be used to calculate of the angular position of the TPMS sensor module with respect to the wheel axis.

The pressure sensor 11 can be incorporated as part of a typical semiconductor technology, and may be a microelectromechanical systems (MEMS) pressure sensor. Therefore, the pressure sensor 11 can enable the TPMS sensor 100, to aid in monitoring tire pressure. The pressure sensor 11, acceleration sensor 14, and the temperature sensor 15 each measure a corresponding physical quantity and provides analog sensor information in the form of electrical signals to the ADC 16, which converts the analog signals into digital signals before providing the MCU 12 with digital sensor information.

Thus, the pressure sensor 11 is electrically connected to the MCU 12 and configured to measure the internal air pressure of a tire. The TPMS sensor module 100 may also include the acceleration sensor 14 electrically connected to the MCU 12 and configured to detect and/or measure an acceleration of the tire (e.g., for detecting a motion of a vehicle or to generate a +−1 g signal used for sensing a rotation direction of the tire). The TPMS sensor module 100 may also include the temperature sensor 15 electrically connected to the MCU 12 and configured to detect and/or measure an internal temperature of the tire, which may be used for compensating one or more pressure sensor measurements. For example, a measured temperature may be used for correcting the temperature dependency of slope and offset of the sensor signal.

A power supply 17 (e.g., a battery cell) is further provided to supply power to the TPMS sensor 100 and its components.

The MCU 12 receives tire pressure information in the form of measurement values from the pressure sensor 11, and processes the information. The MCU 12 may store the tire pressure information and/or prepare the tire pressure information for the RF transceiver 13. The MCU 12 may further receive acceleration information from the acceleration sensor 14 and temperature information from the temperature sensor 15. The RF transceiver 13 receives the collected data for transmission from the MCU 12.

The RF transceiver 13, coupled to the antenna 18, is configured to communicate with an interface device 110, such as a vehicle electronic control unit (ECU) or a transponder, via the antenna 18. While not limited thereto, the RF transceiver 13 may be a Bluetooth Low Energy (BLE)

transceiver configured to transmit and receive Bluetooth signals. As a result, the TPMS sensor module 100 is a BLE device that remains in a low power state (e.g., a sleep mode) except when activated or woken by a wake-up signal (e.g., a Bluetooth wake-up signal) and connected to another Bluetooth device via an RF data communication link for data communication. The power states are controlled by the MCU 12.

The RF transceiver 13 is also configured to detect or measure a signal strength (e.g., power) of received RF signals. For example, the RF transceiver 13 is designed with a receiver sensitivity (i.e., a natural sensitivity threshold), which is a measure of the minimum signal strength that a receiver can detect. In particular, the receiver sensitivity is the weakest signal that a receiver will be able to identify and process. Receiver sensitivity is expressed in dBm. If the signal voltage is below this sensitivity (e.g., at or below the noise floor) then the receiver cannot separate the signal anymore from system noise. The receiver's sensitivity-threshold could be trimmed in production and thus be set to a certain value. If a received signal's power is below the receiver's sensitivity-threshold, the RF transceiver 13 does not react to the received signal as it simply does not detect it. In contract, if a received signal's power is at or above the receiver's sensitivity-threshold, the RF transceiver 13 may process the received signal and provide the processed signal to the MCU 12. The MCU 12 may then trigger a response signal that is responsive to the detected received signal. Accordingly, the TPMS sensor module 100 may use its sensitivity threshold to automatically respond to detected signals without any active processing to calculate directly the signal strength of the received signal.

Alternatively, the RF transceiver 13 can directly measure a signal strength (e.g., power) of received RF signals and derive a received signal strength indicator (RSSI) therefrom. The RF transceiver 13 can then provide the RSSI of a received RF signal to the MCU 12 for further evaluation in order for the MCU 12 to determine whether a response should be transmitted. The RSSI may be provided in either the analog or digital domain to the MCU 12.

The MCU 12 may be in sleep mode until it detects a wake-up signal from the interface device 110 via its transceiver 13. The wake-up signal may be, for example, an advertising signal or any other signal that may trigger the MCU 12 to wake up from a low power state, such as sleep mode. The wake-up signal may be transmitted on an advertising channel.

If relying on the sensitivity threshold of the RF transceiver 13 for detecting wake-up signals, the MCU 12 can infer that when a wake-up signal is detected by the RF transceiver 13 that a signal with sufficient power has been received and warrants processing and a response thereto. Accordingly, upon detecting the wake-up signal, the MCU 12 automatically determines to connect with the interface device 110 and thereby establish an RF (Bluetooth) data communication link therewith for bi-direction data communication. If it is determined that the RF data communication link is to be established via detecting the wake-up signal, the RF data communication link is made and the MCU 12 enters into a connected mode during which bi-direction data communication with the interface device 110 is enabled. After the communication has been completed, the RF data communication link is disconnected and the MCU 12 again enters sleep mode.

The MCU 12 can also rely on actively measuring a signal strength (e.g., power) of received RF signals and deriving an RSSI therefrom to make a determination on whether or not to establish an RF (Bluetooth) data communication link with the interface device. In this case, when the MCU 12 receives the wake-up signal, the MCU 12 wakes up into normal power mode and also enters into an advertising-discovery mode. During the advertising-discovery mode, the MCU 12 determines whether it is to connect with the interface device 110 and thereby establish an RF (Bluetooth) data communication link therewith for bi-direction data communication based on certain criteria to be discussed below. If it is determined that an RF data communication link is to be established, the RF data communication link is made and the MCU 12 enters into a connected mode during which bi-direction data communication with the interface device 110 is enabled. After the communication has been completed, the RF data communication link is disconnected and the MCU 12 again enters sleep mode. On the other hand, if it is determined that an RF data communication link is not to be established, the MCU 12 may reenter sleep mode after a threshold amount of time passes without establishing the RF data communication link with the interface device 110.

It is to be noted that there is a distinction between an advertising channel and an RF data communication link. The advertising channel is used for transmitting advertising packets (i.e., advertisement data) and discovery information that can be exchanged in order to determine whether or not to establish RF data communication link. It has limited bandwidth that is not suitable for transmitting large amounts of data. The RF data communication link is a data channel used in connected mode for exchanging data packets, including large amounts of data such as configuration information and sensor data.

The RF transceiver 13 includes a phase-locked loop (PLL) 21 and a local oscillator 22 (e.g., a crystal oscillator). The local oscillator 22 provides the input frequency for the PLL 115. The PLL 21 generates an output frequency from an input frequency, where the ratio between these two frequencies is exactly defined. If the RF transceiver 13 is in transmitting mode, the PLL output frequency is used as a carrier frequency for the transmission. If the transceiver 13 is in receiving mode, the PLL output frequency is mixed with the received signal received from antenna 18 in order to down-convert the frequency of the received signal to generate a base-band signal.

The RF transceiver 13 is configured to transmit sensor data (e.g., pressure sensor data, acceleration sensor data, temperature sensor data, acceleration sensor data) or other feedback information, including feedback information derived from the sensor data (e.g., velocity/speed data, tire rotation period data, tire load data, etc.) to the interface device 110. The RF transceiver 13, along with the MCU 12, is also used to establish an RF data communication link with the interface device 110 through RSSI measurements and evaluations performed by the TPMS sensor module 100.

Thus, the RF transceiver 13 is electrically connected to the MCU 12 and is configured to transmit an RF signal that carries the sensor data and/or feedback information to the interface device 110. The RF signal may be transmitted by the transceiver 13 autonomously or in response to the MCU 12 receiving data in the form of information, a wake-up signal, an acknowledgement, or a command from the interface device 110, where this data is received by the RF transceiver 13.

In one embodiment, using an RSSI measurement performed by the RF transceiver 13, the MCU 12 is configured to compare the RSSI of a received signal to a predetermined threshold to generate a signal strength comparison result. If the signal strength comparison result indicates that the RSSI of the received signal is equal to or exceeds the predetermined threshold, the MCU 12 determines that the communication criteria for responding to the received signal has been satisfied. If this is the case, the MCU 12 establishes a communication link with the interface device 110 by transmitting a response to the interface device 110 via the RF transceiver 13 and antenna 18. The response includes the unique sensor identifier (ID) of the TPMS sensor module as well as any data requested by the signal received from the interface device 110.

Once the communication link is established between the interface device 110 and the selected TPMS sensor module, the interface device 110 can send configuration information, commands, and other data to the selected TPMS sensor module. It can also receive sensor data and other data from the selected TPMS sensor module.

The interface device 110 may be an ECU integrated in the body of the vehicle or a transponder external to the vehicle used, for example, in the production line or at an auto repair shop. As a transponder, the interface device may be a setting tool, a diagnostic and testing tool, or any other RF transceiver. The interface device 110 is configured to interface with each TPMS sensor module 100 for communication therewith.

The interface device 110 includes an RF transceiver 1 for transmitting wake-up signals and configuration information and for receiving sensor data, discovery information, and/or localization data. The interface device 110 includes a processing unit 2 comprising one or more processors for processing the sensor data, discovery information, and/or localization data and for generating directional RF beams at different transmit power for selecting one of the TPMS sensor modules for data communication. The interface device 110 further includes a memory unit 3 for storing processed sensor data or other information (e.g., tire information). It will be appreciated that while examples may refer to using Bluetooth low energy (BLE) signals for communication, other types of RF signals may be used instead.

The interface device 110 may be configured to receive the sensor data and derive information from the sensor data (e.g., contact patch data, contact patch duration data, velocity/speed data, tire rotation data, tire load data) or may receive one or more of such information directly from the RF transceiver 13 (i.e., from the TPMS sensor module 100).

The TPMS sensor module 100 also includes a receiver path that includes the RF transceiver 13 and the MCU 12. The receiver path may be used for receiving communication data from the interface device 110.

Communication data may include, but is not limited to configuration information, programming information (e.g., for reflashing firmware code), or control information for the TPMS sensor module 100. The RF transceiver 13 may demodulate the received communication signal and provide the data to the MCU 12.

The MCU 12 further includes memory 19 that is configured to store information therein. Memory 19 may also be provided external to the MCU 12, and instead electrically coupled thereto. For example, memory 19 may be used to store tire information for each tire, such as at least one of tire type, tire dimensions (e.g., diameter), tire mileage, or tire wear. Tire information may be separately provided for each tire and may include a brand of tire, tire dimensions, tire materials, tire stiffness parameters, tire tread information, tire season information (e.g., winter or summer tire), and other tire characteristics. Memory 19 may also store numerical values that are representative of a mileage of a tire and/or wear of the tire. These numerical values may be calculated by the MCU 12, for example, from acceleration sensor data.

Alternatively, the interface device 110 may store one or more pieces of tire information, and, may calculate the numerical values that are representative of a mileage of a tire and/or wear of the tire, for example, from acceleration sensor data and the tire information, and may store the numerical values in memory at the interface device 110.

The MCU 12 includes at least one processing circuit (e.g., a signal processor) that receives sensor signals including various sensor data from the pressure sensor 11, the acceleration sensor 14, and the temperature sensor 15, and performs signal processing and/or conditioning thereon. For example, the at least one processing circuit may convert raw sensor measurements into sensor values (e.g., tire pressure values, acceleration values, and temperature values). In addition, the at least one processing circuit of the MCU 12 may calculate one or more of contact patch data, contact patch duration data, velocity/speed data, tire rotation data, tire wear data, and tire load data, as described herein.

The MCU 12 may also control one or more of the sensor devices via control signals. For example, the MCU 12 may prompt one or more sensor devices to make a measurement or may request information stored in memory 19.

In order for the MCU 12 to calculate the vehicle velocity and the traveled distance, tire diameter information stored in memory 19 may be used along with the acceleration sensor data.

Alternatively, the MCU 12 may output sensor data to the RF transceiver 13 for transmission to the interface device 110.

The embodiments are directed to selecting one TPMS sensor module for RF data communication, even if other TPMS sensor modules are in the range of the RF signals. The selection schemes are based on directional information that serves as a basis for selecting between different TPMS sensor modules in order to make a selection to one of the TPMS sensor modules. The interface device 100 selects a TPMS sensor module for communication by targeting the selected TPMS sensor module with a directional RF beam that is generated via beamforming. The TPMS sensor modules are configured to monitor for RF beams that are detectable (i.e., at or above its receiver's sensitivity threshold) and responds to a detected RF beam or are configured to monitor for RF beams having an RSSI that meets or exceeds a predetermined threshold and responds to a received wake-up signal if its signal strength meets the signal strength criteria set by the predetermined threshold.

The advantage of this selection method is that it can also be used in frequency bands with higher range, such as in the Bluetooth band. Therefore, it would enable the switch from the current LF receiver setup to Bluetooth Low Energy. Moreover, Bluetooth is not limited to short distances and therefore could also be used by the vehicle's central unit itself (i.e., the vehicle ECU). Bluetooth Low Energy communication, for example, without using the disclosed directional information and selection scheme would risk communicating with other unintended TPMS sensor modules that are in the RF communication range but not in focus (e.g., TPMS sensor modules located in other vehicles). Accordingly, the proposed selection method would solve an issue of cross-talking with two or more TPMS sensor modules in the vicinity of the interface device 110 (i.e., in range of its RF signals).

Figure 2A:
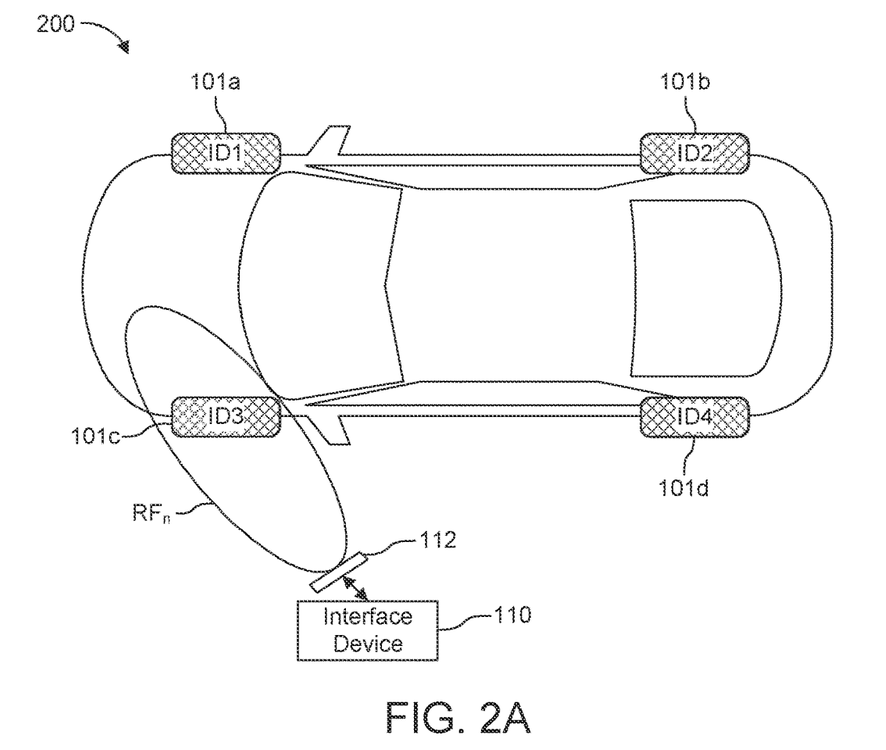
FIGS. 2A and 2B are schematic views of a TPMS sensor module communication system according to one or more embodiments.
Figure 2B:
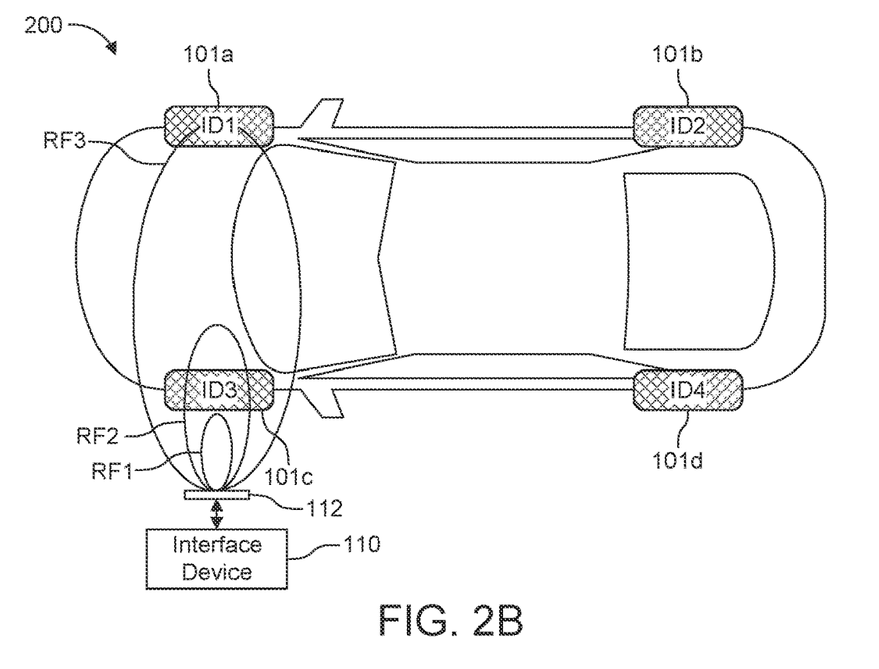

FIGS. 2A and 2B are schematic views of a TPMS sensor module communication system 200 according to one or more embodiments. The TPMS sensor module communication system 200 uses directional RF beams whose transmit power are increased step by step in a stepwise manner until a target TPMS sensor module responds with a response signal either via responding to signal whose power is at or above the receiver's sensitivity threshold or responding to signal after comparing the signal power to a predefined threshold. The TPMS sensor module communication system 200 includes the interface device 110 that includes an antenna array 112 used for transmitting and receiving RF signals. During a selection phase, the antennas of the antenna array 112 are used to generate directional RF beams via beamforming.

For example, antenna configuration of the antenna array 112 can include a two dimensional array of antennas (e.g., dipoles, coils, patch antennas) where each antenna is driven with a phase shifted signal in order to form a directional RF beam. This directional RF beam is directed to a target TPMS sensor module such that a higher field strength is generated at the location of the target TPMS sensor module and a lower field strength is generated at other locations. Using an antenna array 112 allows the interface device 110 to increase the radiated field strength of an RF signal (e.g., a wake-up signal) in a desired direction while reducing the radiated field strength of the RF signal in other directions.

For an array of N×N uniformly spaced radiating antenna elements, the expected beam-focusing can be estimated using an antenna array factor (AF). For example, using an array of 4×4 antenna elements results in a reduction in the field strength by 6 dB (12 dB for power) for all directions deviating more than ±300 from the main direction of the directional beam. For directions perpendicular to antenna array 112, the suppression is much stronger and exceeds 20 dB.

In this way, a target TPMS sensor can receive an RF signal from the interface device 110 that meets or exceeds a sensitivity threshold and/or a predetermined threshold, while the RF signal received at other, non-targeted TPMS sensor modules is kept below their respective sensitivity thresholds and/or the predetermined threshold at those locations. The TPMS sensor modules are configured to respond to a received signal only if (1) it is detected via reliance on its sensitivity threshold or (2) the measured signal strength (e.g., the RSSI) meets or exceeds the predetermined threshold.

The TPMS sensor module communication system 200 includes a plurality of TPMS sensor modules 100 each assigned with a unique identifier ID1, ID2, ID3, and ID4. In this case, the TPMS sensor modules 100 are arranged inside a respective tire 101a-101d but could also be arranged outside a tire in a production line. Each of the TPMS sensor modules 100 are arranged at a different location with respect to the antenna array 12 in terms of different angular directions (angles) and/or distances. As a result, the TPMS sensor modules 100 can be targeted on a one-by-one basis by directional RF beams having a controlled direction and a controlled signal strength in that direction. Thus, the interface device 110 is able to select each one individually for establishing the RF data communication link therewith and is further able to ensure that no other TPMS sensor modules are triggered unintentionally.

In FIG. 2A, the interface device 110 selects the TPMS sensor module having identifier ID3 for communication by transmitting a directional RF beam RFn thereat. If the directional RF beam RFn has a signal strength that meets or exceeds a sensitivity threshold or a predetermined threshold (depending on the implementation), the TPMS sensor module having identifier ID3 transmits an RF response signal with its identifier ID3. The directional RF beam RFn may be a wake-up signal that triggers each receiving TPMS sensor module 100 to wake up from a low power state, and may further cause the TPMS sensor module 100 to determine whether the wake-up signal meets or exceeds the predetermined threshold and transmit a response with their ID if the determination is in the affirmative. Optionally, the transmissions from the TPMS sensor modules 100 can also contain or be followed by a constant carrier wave (CW).

In response to receiving a response signal from a TPMS sensor module, the interface device 110 may use the received sensor ID to transmit one or more addressed messages to the responding TPMS sensor model. An addressed message is one that contains the sensor ID of the intended TPMS sensor module, for example, with the sensor ID provided in a message header. The responding TPMS sensor model is further configured to process the payload of addressed message(s) that match its sensor ID. Those TPMS sensor modules that receive a message not addressed thereto (i.e., containing a different sensor ID), is further configured to ignore payload of the message or otherwise discard the message.

By receiving an RF signal addressed via sensor ID to the selected TPMS sensor module, the RF data communication link is established and the selected TPMS sensor module is capable of performing bi-directional data communication with the interface device 110. The other TPMS sensor modules, having not been selected for communication, reenter their low power state where they can wait for the next wake-up signal.

In FIG. 2B, the interface device 110 selects the TPMS sensor module having identifier ID3 for communication by transmitting directional RF beams having different field strengths towards a target TPMS sensor module. Here, three directional RF beams RF1, RF2, and RF3 are shown, each directed at the TPMS sensor module having identifier ID3 but with different field strengths. Directional RF beam RF1 has the lowest field strength and while the RF signal thereof reaches the TPMS sensor module ID3, its field strength is less than the sensitivity threshold or the predetermined threshold required to trigger a response signal. Directional RF beam RF2 has an increased field strength compared to that of directional RF beam RF1 and is of sufficient magnitude to trigger a response signal from TPMS sensor module ID3 (i.e., it is either greater than the sensitivity threshold or it is greater than the sensitivity threshold and equal to or greater than the predetermined threshold). The field strength of directional RF beam RF2 is also appropriately set as to not trigger a response signal from another, unintended TPMS sensor module. In contrast, directional RF beam RF3 has an increased field strength compared to that of directional RF beam RF2 and is of sufficient magnitude to trigger a response signal from TPMS sensor module ID3. However, directional RF beam RF3 is set too strongly, as it also reaches TPMS sensor module ID1 and triggers a response signal therefrom.

With the field strength of directional RF beam RF3 being set too strongly, an issue of cross-talk is created. This situation can be avoided by stepwise increasing the power and thus the field strength of the transmitted directional RF beams until a response from the target TPMS sensor module is received. In particular, the interface device 110 is configured to stepwise increase of the antenna transmit power in discrete steps until the target TPMS sensor module replies with its response signal. It is noted that when a directional RF beam is transmitted, the RF signal still radiates towards the other TPMS sensor modules but with much lower signal strength that either does not satisfy the sensitivity threshold of the other receivers or does not satisfy the predetermined threshold set at the other receivers). As a result of the stepwise power increases, it is ensured that a directional RF beam with sufficient power is received by the target TPMS sensor module to trigger a response while the RF signal received by the other TPMS sensor modules is received with insufficient power to trigger a response therefrom.

The combination of using directional RF beams that are stepwise increased in power avoid the situation in which TPMS sensor modules other than the intended one detect and respond to the wake-up signal from the interface device 110. This approach solves the issue of two or more TPMS sensor modules cross-talking with the interface device 110 when using RF signals to selectively activate a TPMS sensor module in an RF environment while other TPMS sensor modules are in range of the RF signals.

Figure 3:
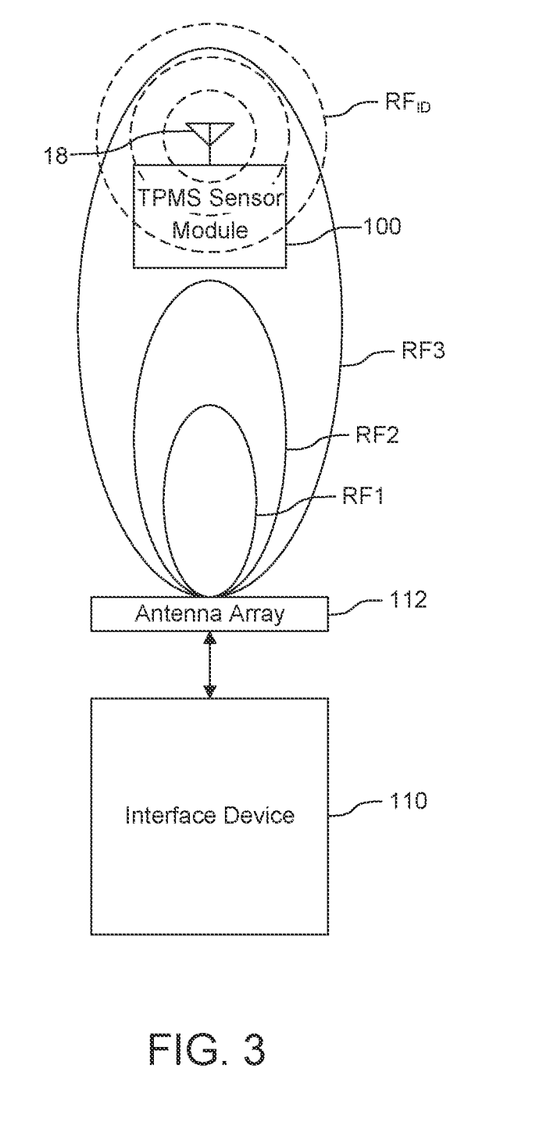
FIG. 3 illustrates the tire pressure monitoring system of FIG. 1 while using stepwise power-increased directional RF beams according to one or more embodiments.

FIG. 3 illustrates the tire pressure monitoring system of FIG. 1 while using stepwise power-increased directional RF beams according to one or more embodiments. As an example, the interface device 110 is configured to stepwise increase the output power of its directional RF beams from an initial low power setting to higher discrete power levels. The interface device 110 uses its antenna array 112 to transmit a first directional beam RF1 at a first power setting towards a target TPMS sensor module 100. However, because the signal strength of the first directional beam RF1 is less than the sensitivity threshold and/or the predetermined threshold, the target TPMS sensor module 100 does not transmit a response signal.

The interface device 110 waits for a predetermined time interval for a response from the target TPMS sensor module 100. The predetermined time interval starts at the transmission time of the first directional beam RF1. After the predetermined time interval lapses without receiving a response, the interface device 110 proceeds to use its antenna array 112 to transmit a second directional beam RF2 at a second power setting towards the target TPMS sensor module 100. The second power setting is higher than the first power setting such that the second directional beam RF2 has a higher signal strength than the first directional beam RF1. However, because the signal strength of the second directional beam RF2 is still less than the predetermined threshold, the target TPMS sensor module 100 does not transmit a response signal.

The interface device 110 waits for the predetermined time interval for a response from the target TPMS sensor module 100. The predetermined time interval starts at the transmission time of the second directional beam RF2. After the predetermined time interval lapses without receiving a response, the interface device 110 proceeds to use its antenna array 112 to transmit a third directional beam RF3 at a third power setting towards the target TPMS sensor module 100. The third power setting is higher than the second power setting such that the third directional beam RF3 has a higher signal strength than the second directional beam RF2. In this case, the target TPMS sensor module 100 determines that it has been selected for communication by the interface device 110 in response to either detecting the signal outright (i.e., via its sensitivity threshold) or detecting that the signal strength of the third directional beam RF3 is equal to or greater than the predetermined threshold. As a result of this detection, the target TPMS sensor module 100 wakes up and transmits a response signal $RF_{ID}$ that includes its sensor ID.

The response signal $RF_{ID}$ may additionally include requested data (e.g., sensor and/or diagnostic data) via messages addressed to the ID of the interface device 110. For example, the wake-up signal may include the ID of the interface device 110 as well as a request for data (e.g., sensor data and/or diagnostic data) from the target TPMS sensor module. In this case, when responding to a directional RF beam detected with sufficient power to trigger a response, the target TPMS sensor module 100 may respond with the requested data along with its sensor ID. Alternatively, if the wake-up signal does not include a request for data, the interface device 110 may transmit one or more addressed messages that include a request for data in response to receiving the response signal $RF_{ID}$ from the target TPMS sensor module 100. Upon receiving data from the target TPMS sensor module 100, the interface device 110 is configured to record and/or process the received data.

In addition, any further communication performed by the interface device 110 is done at the power setting responsible for triggering the response signal $RF_{ID}$ from the target TPMS sensor module 100. Upon receiving the response signal $RF_{ID}$, the interface device 110 maintains the transmit power setting, for example, of a power amplifier, used for the wake-up signal that triggered the response signal $RF_{ID}$. In this example, the third directional beam RF3 triggers the response signal RF1. Therefore, the interface device 110 uses the transmit power setting used for transmitting the third directional beam RF3 for further communication with the target TPMS sensor module 100. For example, a CPU of the interface device 110 may record a power setting of the directional beam to which a response signal is responsive for use in further communications with the target TPMS sensor module 100.

Figure 4:
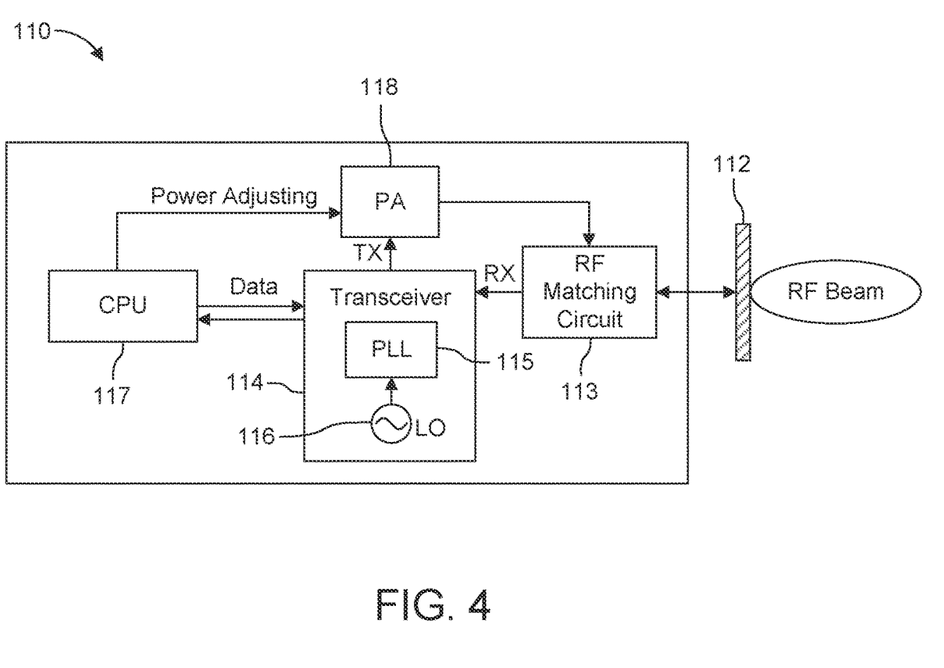
FIG. 4 illustrates a schematic block diagram of a communication interface device according to one or more embodiments.

FIG. 4 illustrates a schematic block diagram of a communication interface device 110 according to one or more embodiments. The communication interface device 110 shown in FIG. 4 represents one possible implementation of the communication interface device 110 shown in FIG. 1. The interface device 110 includes an antenna array 112, an RF matching circuit 113 coupled to the antenna array 112, an RF transceiver 114 including a PLL 115 and a local oscillator 116, a central processing unit (CPU) 117, and a power amplifier (PA) 118.

The RF transceiver 114 receives receive (RX) signals from the RF matching circuit 113 and transmits transmit (TX) signals to the power amplifier 118 where they are amplified according to a power setting.

The local oscillator 116 provides the input frequency for the PLL 115. The PLL 115 generates an output frequency from an input frequency, where the ratio between these two frequencies is exactly defined. If the RF transceiver 114 is in transmitting mode, the PLL output frequency is used as a carrier frequency for the transmission. If the transceiver 114 is in receiving mode, the PLL output frequency is mixed with the received signal received from the antenna array 112 in order to down-convert the frequency of the received signal to generate a base-band signal (i.e., a phase signal).

The RF matching circuit 113 coupled between the RF transceiver 114 and the antenna array 112 is configured to adapt antenna-impedance to transmitter-impedance or receiver-impedance. It typically consists of passive elements like capacitors or inductivities. This impedance matching is used for operating a transmitter with a high efficiency and to achieve a sufficient receiver sensitivity. A matching circuit also may serve as a filter which removes out-of-band signals.

The RF matching circuit 113 is also coupled between the power amplifier 118 and the antenna array 112. The RF matching circuit 113 receives amplified transmit signals from the power amplifier 118 an passes the amplified transmit signals to the antenna array 112.

The RF transceiver 114 is coupled to the CPU 117 and is configured to transmit data (e.g., a sensor ID, sensor data, and/or diagnostic data) received in a receive (RX) signal to the CPU 117 and is configured to receive data and commands from the CPU 117 that are to be transmitted to a TPMS sensor module 100. The CPU 117 is configured to process and/or store the data received in a receive (RX) signal.

The CPU 117 is further configured to monitor for response signals, such as response signal $RF_{ID}$, from a TPMS sensor module after a transmission of a wake-up signal and controls the power setting of the power amplifier 118 accordingly. For example, the CPU 117 may set via a power adjusting control signal, the power setting of the power amplifier 118 at an initial low power setting for a first wake-up signal and subsequently increase the power setting of the power amplifier 118 in a stepwise manner until a response signal $RF_{ID}$ is received from a TPMS sensor module. The CPU 117 may increase the power setting of the power amplifier 118 after a predetermined time interval lapses without having received a response signal $RF_{ID}$ from a TPMS sensor module.

Figure 5A:
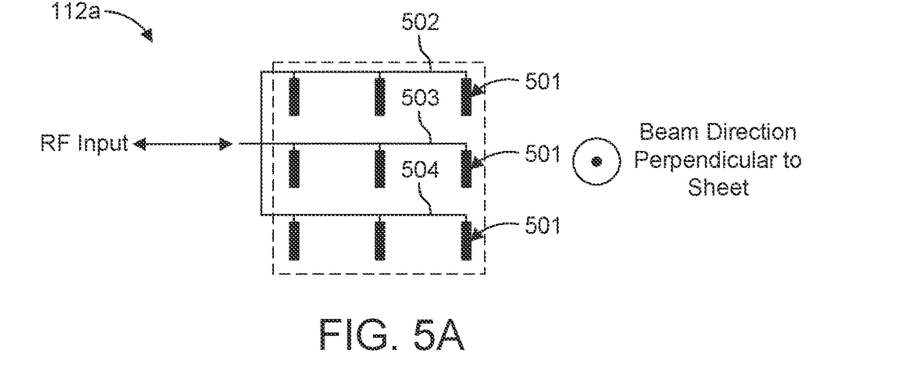
FIGS. 5A-5C illustrate various antenna configurations for an antenna array according to one or more embodiments.
Figure 5B:
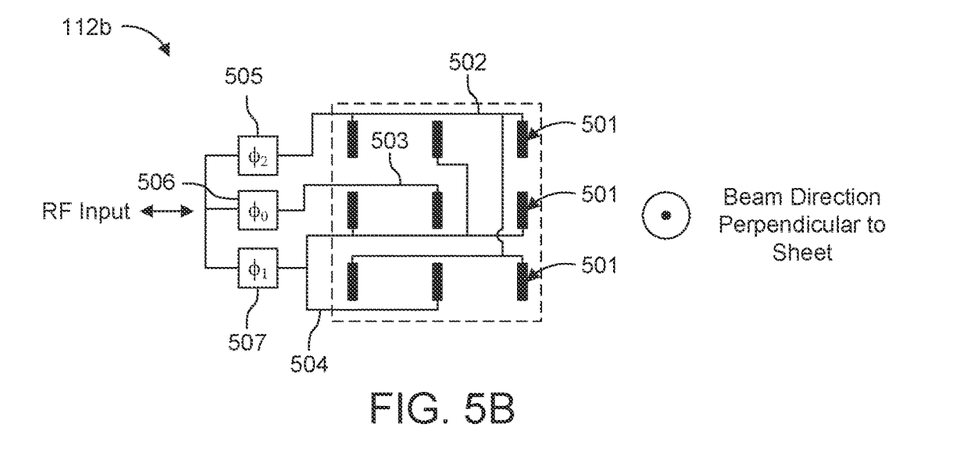
Figure 5C:
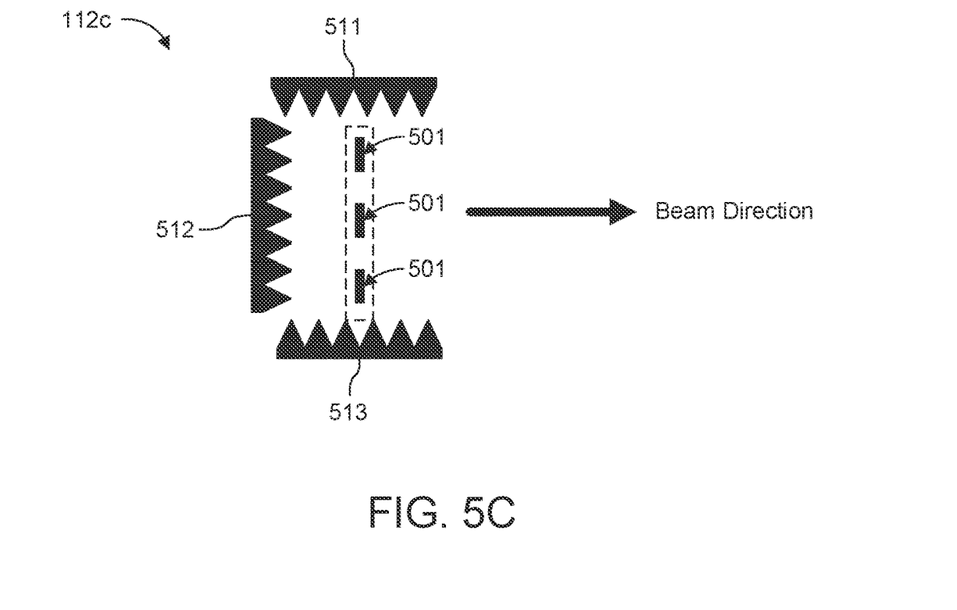

FIGS. 5A-5C illustrate various antenna configurations for an antenna array according to one or more embodiments. In particular, FIG. 5A illustrates an antenna array 112a having a 3×3 array of dipole antenna elements 501. The antenna array 112a includes multiple antennas 502, 503, and 504, each including three of the dipole antenna elements 501. The antennas 502, 503, and 504 are driven by an RF input received from RF transceiver 114 that has been amplified by the power amplifier 118 according to a power setting and sequent passed through the RF matching circuit 113. In response to receiving the RF input, the antenna array 112a generates a directional RF beam having a main beam direction that is perpendicular to the sheet.

FIG. 5B illustrates an antenna array 112b having a 3×3 array of dipole antenna elements 501. The antenna array 112b includes multiple antennas 502, 503, and 504, each including a different subset of the dipole antenna elements 501. Each antenna 502, 503, and 504 is driven with a phase-shifted signal in order to form a directional RF beam having a main beam direction that is perpendicular to the sheet. In particular, the antenna array 112b includes three phase shifters 505, 506, and 507 each coupled to a respective antenna 502, 503, or 504. Each phase shifter 505, 506, and 507 receives an RF input and applies a phase shift $\phi_0$, $\phi_1$, or $\phi_2$ thereto according to a phase-shift setting that may be controlled by the CPU 117. The phase-shifts may be adjusted in order to form the directional RF beam with desired properties.

FIG. 5C illustrates a lateral view of an antenna array 112c having an array of dipole antenna elements 501. Here, the antenna array 112c may have a similar configuration to the antenna elements shown in either FIG. 5A or 5B. However, in this case, multiple absorbers 511, 512, and 513 are arranged laterally around the antenna elements 501 with the exception of the lateral side at which the directional RF beam is directed. The absorbers 511, 512, and 513 are configured to absorb or suppress RF radiation, therefor shielding unintended TMPS sensor modules from RF signals. In other words, the antenna array 112c ensures that a directional RF beam is directed at the target TPMS module while further ensuring that the field strength of the RF signal is sufficiently reduced in other directions so as to not trigger a response from unintended TMPS sensor modules.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A tire pressure monitoring system (TPMS), comprising:
a communication interface device comprising:
a first radio frequency (RF) transceiver configured to:
generate at least one wake-up signal,
wherein the at least one wake-up signal is configured to cause a TPMS sensor module to transition from a low power state to an active state;
an antenna array configured to:
transmit, via an advertising channel, the at least one wake-up signal as a directional RF beam, wherein the advertising channel comprises a limited bandwidth relative to an RF data communication link; and
a first processing circuit configured to:
monitor for a response signal in response to the antenna array transmitting the at least one wake-up signal;
the TPMS sensor module having a sensor identifier (ID), wherein the TPMS sensor module comprises:
a pressure sensor configured to:
measure an internal air pressure of a first tire, and generate first tire pressure information;
a second RF transceiver configured to:
receive the at least one wake-up signal; and
a second processing circuit configured to:
measure a signal strength of the at least one wake-up signal,
compare the measured signal strength to a predetermined threshold, and
trigger the response signal on a condition that the measured signal strength is equal to or greater than the predetermined threshold,
wherein the second RF transceiver is further configured to:
transmit the response signal via the RF data communication link, the response signal comprising at least the sensor ID.

2. The TPMS of claim 1, wherein the second processing circuit is configured to:
disregard a wake-up signal based on a measured signal strength of the wake-up signal being less than the predetermined threshold.

3. The TPMS of claim 1, wherein the communication interface device further comprises:
a power amplifier configured to:
set a power of each wake-up signal according to an adjustable power setting such that the power of each subsequent wake-up signal is increased in discrete steps until the response signal is received by the first RF transceiver.

4. The TPMS of claim 1, wherein:
the communication interface device further comprises:
a power amplifier configured to:
set a power of each wake-up signal according to an adjustable power setting,
the antenna array is further configured to:
transmit a first wake-up signal at a first power setting,
the first processing circuit is further configured to:
monitor for the response signal in response to the first wake-up signal,
on a condition that the response signal is not received in response to the first wake-up signal, increase the adjustable power setting of the power amplifier to a second power setting, and
the antenna array is further configured to:
transmit a second wake-up signal at the second power setting.

5. The TPMS of claim 4, wherein, on a condition that the response signal is received in response to the first wake-up signal, the first processing circuit is further configured to:
transmit a message signal addressed to the TPMS sensor module at the first power setting.

6. The TPMS of claim 5, wherein, the first processing circuit is further configured to:
monitor for the response signal in response to the first wake-up signal for a predetermined time interval, and
determine that the response signal has not been received if the response signal is not received within the predetermined time interval.

7. The TPMS of claim 4, wherein:
the first processing circuit is configured to:
monitor for the response signal in response to the second wake-up signal, and
on a condition that the response signal is received in response to the second wake-up signal, transmit a message signal addressed to the TPMS sensor module at the second power setting.

8. A method of communicating with a tire pressure monitoring system (TPMS) sensor module, the method comprising:
transmitting, by a communication interface device and via an advertising channel, a first wake-up signal as a first directional radio frequency (RF) beam,
the advertising channel comprising a limited bandwidth relative to a data communication link, and
the first wake-up signal being transmitted for establishing the data communication link with the TPMS sensor module;
receiving, by the TPMS sensor module, the first wake-up signal;
measuring, by the TPMS sensor module, a signal strength of the first wake-up signal;
comparing, by the TPMS sensor module, the measured signal strength to a predetermined threshold;
on a condition that the measured signal strength is equal to or greater than the predetermined threshold, triggering, by the TPMS sensor module, a first response signal in response to the first wake-up signal; and
transmitting, by the TPMS sensor module and via the data communication link, the first response signal,
wherein the first response signal includes a sensor identifier (ID) of the TPMS sensor module.

9. The method of claim 8, further comprising:
on a condition that the measured signal strength is less than the predetermined threshold, disregarding, by the TPMS sensor module, the first wake-up signal.

10. The method of claim 8, further comprising:
monitoring, by the communication interface device, for the first response signal in response to the first wake-up signal; and
on a condition that the first response signal is not received in response to the first wake-up signal, transmitting, by the communication interface device, a second wake-up signal as a second directional RF beam at a power level higher than a power level of the first directional RF beam, the second wake-up signal being transmitted for establishing the data communication link with the TPMS sensor module.

11. The method of claim 10, further comprising:
receiving, by the TPMS sensor module, the second wake-up signal;
measuring, by the TPMS sensor module, a signal strength of the second wake-up signal;
comparing, by the TPMS sensor module, the measured signal strength of the second wake-up signal to the predetermined threshold;
on a condition that the measured signal strength of the second wake-up signal is equal to or greater than the predetermined threshold;
triggering, by the TPMS sensor module, a second response signal in response to the second wake-up signal; and
transmitting the second response signal.

12. The method of claim 11, further comprising:
monitoring, by the communication interface device, for the second response signal in response to the first wake-up signal; and
on a condition that the second response signal is received in response to the second wake-up signal, transmitting, by the communication interface device, a message signal addressed to the TPMS sensor module at the power level higher than the power level of the first directional RF beam.

13. The method of claim 8, further comprising:
monitoring, by the communication interface device, for the first response signal in response to the first wake-up signal; and
on a condition that the first response signal is received in response to the first wake-up signal, transmitting, by the communication interface device, a message signal addressed to the TPMS sensor module at a power level of the first directional RF beam.

14. A tire pressure monitoring system (TPMS) sensor module having a sensor identifier (ID), the TPMS sensor module comprising:
a pressure sensor configured to:
measure an internal air pressure of a first tire, and generate first tire pressure information;
a radio frequency (RF) transceiver configured to:
receive, via an advertising channel, a wake-up signal for establishing data communication, wherein the advertising channel comprises a limited bandwidth relative to a data communication link for the data communication; and
a processing circuit configured to:
transition from a low power state to an active state based on the wake-up signal,
measure a signal strength of the wake-up signal,
compare the measured signal strength to a predetermined threshold, and
trigger a response signal on a condition that the measured signal strength is equal to or greater than the predetermined threshold,
wherein the RF transceiver is further configured to:
transmit, via the data communication link, the response signal, wherein the response signal comprises at least the sensor ID.

15. The TPMS sensor module of claim 14, wherein the processing circuit is configured to disregard the wake-up signal on a condition that the measured signal strength is less than the predetermined threshold.

16. A tire pressure monitoring system (TPMS), comprising:
a communication interface device configured to communicate with a target TPMS sensor module, the communication interface device comprising:
a radio frequency (RF) transceiver configured to;
generate at least one wake-up signal,
wherein the at least one wake-up signal is configured to cause a TPMS sensor module to transition from a low power state to an active state;
an antenna array configured to:
transmit, via an advertising channel, the at least one wake-up signal as a directional RF beam, wherein the advertising channel comprises a limited bandwidth relative to an RF data communication link; and
a processing circuit configured to:
monitor for a response signal in response to the antenna array transmitting the at least one wake-up signal,
record a power setting of a wake-up signal of the at least one wake-up signal to which the response signal is responsive, and
control the RF transceiver to transmit, via the RF data communication link a communication signal towards the target TPMS sensor module with the power setting of the wake-up signal to which the response signal is responsive.

17. The TPMS of claim 16, wherein the communication interface device further comprises a power amplifier configured to set a power of each wake-up signal according to an adjustable power setting such that the power of each subsequent wake-up signal is increased in discrete steps until the response signal is received by the RF transceiver.

18. The TPMS of claim 16, wherein the communication interface device further comprises:
a power amplifier configured to:
set a power of each wake-up signal according to an adjustable power setting,
wherein the antenna array is further configured to:
transmit a first wake-up signal at a first power setting,
wherein the processing circuit is further configured to:
monitor for the response signal in response to the first wake-up signal,
on a condition that the response signal is not received in response to the first wake-up signal, increase the adjustable power setting of the power amplifier to a second power setting, and
wherein the antenna array is further configured to:
transmit a second wake-up signal at the second power setting.

19. The TPMS of claim 18, wherein, on a condition that the response signal is received in response to the first wake-up signal, the processing circuit is configured to:
transmit a message signal addressed to the target TPMS sensor module at the first power setting.

20. The TPMS of claim 19, wherein:
the processing circuit is further configured to:
monitor for the response signal in response to the second wake-up signal, and
on a condition that the response signal is received in response to the second wake-up signal, the processing circuit is further configured to:
transmit a message signal addressed to the target TPMS sensor module at the second power setting.

21. A tire pressure monitoring system (TPMS), comprising:
a communication interface device comprising:
a first radio frequency (RF) transceiver configured to:
generate at least one wake-up signal,
wherein the at least one wake-up signal is configured to cause a TPMS sensor module to transition from a low power state to an active state;
an antenna array configured to:
transmit, via an advertising channel, the at least one wake-up signal as a directional RF beam, wherein the advertising channel comprises a limited bandwidth relative to an RF data communication link;
a first processing circuit configured to:
monitor for a response signal in response to the antenna array transmitting the at least one wake-up signal; and
a power amplifier configured to:
set a power of each wake-up signal according to an adjustable power setting such that the power of each subsequent wake-up signal is increased in discrete steps until the response signal is received by the first RF transceiver; and
the TPMS sensor module having a sensor identifier (ID), wherein the TPMS sensor module comprises:
a pressure sensor configured to:
measure an internal air pressure of a first tire and generate first tire pressure information;
a second RF transceiver configured to:
receive the at least one wake-up signal, wherein the second RF transceiver has a receiver sensitivity threshold; and
a second processing circuit configured to:
detect a wake-up signal that meets or exceeds the receiver sensitivity threshold, and
trigger the response signal in response to detecting the wake-up signal,
wherein the second RF transceiver is further configured to:
transmit the response signal via the RF data communication link, the response signal comprising at least the sensor ID.

22. The TPMS of claim 21, wherein:
the antenna array is further configured to transmit a first wake-up signal at a first power setting,
the first processing circuit is further configured to monitor for the response signal in response to the first wake-up signal,
on a condition that the response signal is not received in response to the first wake-up signal:
the first processing circuit is configured to:
increase the adjustable power setting of the power amplifier to a second power setting, and
the antenna array is configured to:
transmit a second wake-up signal at the second power setting.

23. The TPMS of claim 22, wherein, on a condition that the response signal is received in response to the first wake-up signal, the first processing circuit is configured to transmit a message signal addressed to the TPMS sensor module at the first power setting.

24. The TPMS of claim 23, wherein, the first processing circuit is configured to monitor for the response signal in response to the first wake-up signal for a predetermined time interval and determine that the response signal has not been received if the response signal has not been received within the predetermined time interval.

25. The TPMS of claim 22, wherein the first processing circuit is configured to:
monitor for the response signal in response to the second wake-up signal, and
on a condition that the response signal is received in response to the second wake-up signal, transmit a message signal addressed to the TPMS sensor module at the second power setting.

26. The TPMS of claim 21, wherein the first processing circuit is configured to record a power setting of a wake-up signal of the at least one wake-up signal to which the response signal is responsive and set the adjustable power setting to the power setting of the wake-up signal to which the response signal is responsive for transmitting a communication signal towards the TPMS sensor module.

* * * * *